(12) United States Patent
Korenaga et al.

(10) Patent No.: US 7,776,232 B2
(45) Date of Patent: Aug. 17, 2010

(54) POWDERY WHITE VULCANIZATION PROMOTER COMPOSITION AND RUBBER COMPOSITIONS

(75) Inventors: Takashi Korenaga, Nishinomiya (JP); Takashi Deguchi, Nishinomiya (JP); Shoichi Tsutsui, Nishinomiya (JP)

(73) Assignee: Shiraishi Kogyo Kaisha, Ltd., Osaka (JP)

( * ) Notice: Subject to any disclaimer, the term of this patent is extended or adjusted under 35 U.S.C. 154(b) by 0 days.

(21) Appl. No.: 11/661,287

(22) PCT Filed: Aug. 31, 2005

(86) PCT No.: PCT/JP2005/015852

§ 371 (c)(1), (2), (4) Date: Feb. 27, 2007

(87) PCT Pub. No.: WO2006/025423

PCT Pub. Date: Mar. 9, 2006

(65) Prior Publication Data

US 2007/0293621 A1 Dec. 20, 2007

(30) Foreign Application Priority Data

Sep. 1, 2004 (JP) ............................. 2004-254902

(51) Int. Cl.
*C09C 1/02* (2006.01)
*C01F 11/18* (2006.01)

(52) U.S. Cl. ............................. 252/182.14; 252/182.13; 252/182.32; 252/182.35; 106/464; 106/465; 106/466; 106/470; 106/482; 428/404; 423/430

(58) Field of Classification Search ............... 524/425, 524/492, 426, 442, 571, 574; 252/182.14, 252/182.13; 106/464, 463, 465; 423/430
See application file for complete search history.

(56) References Cited

U.S. PATENT DOCUMENTS 3,857,925 A * 12/1974 Sirianni et al. ............... 423/339
4,886,703 A * 12/1989 Hasumi et al. ............... 428/323
5,739,198 A * 4/1998 Sandstrom et al. .......... 524/493
5,896,904 A * 4/1999 Ozaki et al. ................. 523/200
6,147,147 A 11/2000 Hoover et al. ............... 524/175
6,220,323 B1 * 4/2001 Sandstrom et al. ....... 152/209.5
2008/0110544 A1* 5/2008 Nakamura ................... 152/525

FOREIGN PATENT DOCUMENTS

| JP | 51-23540 | | 2/1976 |
| JP | 54-68860 | A | 6/1979 |
| JP | 55-113619 | A | 9/1980 |
| JP | 56-104950 | * | 8/1981 |
| JP | 56-104950 | A | 8/1981 |
| JP | 11-293130 | * | 10/1999 |
| JP | 2003-155380 | A | 5/2003 |
| JP | 2003-192842 | A | 7/2003 |
| JP | 2004-051774 | * | 2/2004 |
| JP | 2004-51774 | A | 2/2004 |
| JP | 2005-048102 | * | 2/2005 |
| JP | 2005-48102 | A | 2/2005 |
| WO | 2004/009711 | A1 | 1/2004 |

OTHER PUBLICATIONS

JP 2005-048102 (Tsutsui et al.,Feb. 2005); abstract and translation in English.*
JP 56-104950 (Furusawa et al., Aug. 1981); abstract and translation in English.*
JP 2004-051774 (Tsutsui et al., Feb. 2004); abstract and translation in English.*

* cited by examiner

*Primary Examiner*—Rip A. Lee
(74) *Attorney, Agent, or Firm*—Kubovcik & Kubovcik

(57) ABSTRACT

A powdery white vulcanization promoter composition which is excellent in storage stability, the resistance of blends thereof with rubbers or the like to heat build-up, and design; and rubber compositions containing the same. Specifically, a vulcanization promoter composition which comprises a modified calcium carbonate (A) surface-treated with a fatty acid or a resin acid and a silicic acid, an inorganic filler (B) exhibiting an oil absorption of as high as 50 to 300 ml/100 g, and a vulcanization promoter component (C) liquid at ordinary temperatures, characterized in that the (A):(B) mixing ratio is within the range of 30:70 to 95:5 and the content of (C) is 30 to 80 wt % based on the whole of the promoter composition.

7 Claims, No Drawings

POWDERY WHITE VULCANIZATION PROMOTER COMPOSITION AND RUBBER COMPOSITIONS

This application is a 371 of international application PCT/JP2005/015852 filed Aug. 31, 2005, which claims priority based on Japanese patent application No. 2004-254902 filed Sep. 1, 2004, each of which is incorporated herein by reference.

TECHNICAL FIELD

The present invention relates to a powdery white vulcanization promoter composition, and a rubber composition containing the same.

BACKGROUND ART

Conventionally, precipitated silica has mainly been used as a white reinforcing filler in rubber compositions. However, a rubber composition into which precipitated silica is blended has problems as described in the following, as compared with other white fillers: (1) the viscosity of the rubber which has not been vulcanized is high; (2) the vulcanizing speed becomes small; (3) the precipitated silica is not easily dispersed since the silica has a high self-aggregating property; and (4) the rubber elasticity is damaged although the reinforcing performance becomes high.

As a means for solving such problems, attempts of incorporating various vulcanization promoters, such as a silane coupling agent, are made (Patent Documents 1 and 2).

Usually, a silane coupling agent is in a liquid form at ordinary temperature. However, the agent is not easily mixed with rubber which is the partner material therewith since the rubber is in a solid form. Moreover, the agent is not uniformly dispersed with ease since the amount thereof added to the rubber is relatively small.

Known is a rubber composition wherein a silane coupling agent is supported on carbon black at an amount of about 50%, thereby improving the workability and reinforcing performance, in order to make the handling easy and improve the dispersibility (Patent Document 3). However, the composition is unsuitable for colored rubber products since the rubber is colored into black.

It can be supposed that a silane coupling agent is supported on a white filler such as calcium carbonate (Patent Document 4), or precipitated silica or hydrated calcium silicate (Patent Document 5) in order to improve the designability. However, since the water content in precipitated silica is high, it is feared that the silane coupling agent is inactivated. Thus, there arise problems regarding the storage stability and the storage control. Conventional calcium carbonate cannot be made into a high concentration since the calcium carbonate exhibits a small oil absorption. Moreover, the calcium carbonate has a problem regarding the reinforcing performance since particles of the calcium carbonate are not smaller than those of carbon black or precipitated silica.

Patent Document 1: Japanese Patent Application Laid Open (JP-A) No. 2003-155380
Patent Document 2: JP-A No. 2003-192842
Patent Document 3: JP-A No. 54-68860
Patent Document 4: JP-A No. 56-104950
Patent Document 5: JP-A No. 51-23540

DISCLOSURE OF THE INVENTION

An object of the present invention is to provide a powdery white vulcanization promoter composition which is excellent in storage stability, resistance to heat build-up when the composition is blended into rubber or the like, and designability; and a rubber composition containing the composition.

The powdery white vulcanization promoter composition of the present invention is a powdery white vulcanization promoter composition comprising modified calcium carbonate (A) surface-treated with a fatty acid or a resin acid and a silicic acid, a highly oil-absorbing inorganic filler (B) exhibiting an oil absorption of 50 to 300 mL/100 g, and a vulcanization promoter (C) which is in a liquid form at ordinary temperature (room temperature), wherein the mixing ratio by weight of the modified carbon calcium (A) to the inorganic filter (B) (the ratio of (A):(B)) is within a range of from 30:70 to 95:5, and the content by percentage of the vulcanization promoter (C) is from 30 to 80% by weight based on the total of the composition.

The primary particle diameter of the modified calcium carbonate (A) is preferably from 0.01 to 0.5 μm.

As the vulcanization promoter (C), for example, at least one selected from an organic silane compound, an organic titanate compound, and an organic aluminate compound can be used.

As the inorganic filler (B), for example, at least one selected from silica, aluminum hydroxide, calcium silicate, and magnesium carbonate can be used.

The rubber composition of the present invention is characterized in that the above-mentioned powdery white vulcanization promoter composition of the present invention and precipitated silica are blended into a rubber.

It is preferable that the powdery white vulcanization promoter composition is contained in the rubber composition of the present invention so as to set the amount of the vulcanization promoter (C) to the range of 1 to 40 parts by weight based on 100 parts by weight of the precipitated silica.

The powdery white vulcanization promoter composition of the present invention is a powdery material containing the liquid vulcanization promoter for vulcanizing rubber or the like; therefore, the composition is easily handled, and the vulcanization promoter can be uniformly dispersed when the composition is blended into rubber or the like. Moreover, the composition can be colored since the composition is white. Thus, the composition can be used to produce a colored rubber product. Accordingly, a rubber product excellent in designability can be produced.

Moreover, the powdery white vulcanization promoter composition of the present invention is excellent in storage stability. For this reason, the composition can be stored for a long term, and the handling and storage control thereof are easy.

When the powdery white vulcanization promoter composition of the present invention is blended into rubber or the like, good resistance to heat build-up can be given thereto.

Since the rubber composition of the present invention contains the powdery white vulcanization promoter composition of the present invention, the rubber composition is excellent in resistance to heat build-up and designability.

BEST MODE FOR CARRYING OUT THE INVENTION

The present invention will be specifically described hereinafter.

<Modified Calcium Carbonate (A)>

The modified calcium carbonate used in the present invention is surface-treated with a fatty acid or a resin acid and a silicic acid.

It is sufficient that the modified calcium carbonate has a structure wherein the whole or a part of the surface of raw material calcium carbonate particles or treated calcium carbonate particles is covered with a fatty acid, a resin acid and a silicic acid. Thus, it is not necessarily essential that the whole of the surface is continuously covered. In addition, the order of the treatments is not limited.

As calcium carbonate, which is the starting material of the modified calcium carbonate, known ground calcium carbonate or synthetic (precipitating) calcium carbonate, or the like may be used.

Ground calcium carbonate can be prepared by a method of pulverizing naturally-produced calcium carbonate ore in a dry or wet manner, or some other method, using a roller mill, a high-speed rotary mill (impact shearing mill), a container-driving medium mill (ball mill), a medium stirring mill, a planetary mill, a jet mill or the like.

Synthetic (precipitating) calcium carbonate can be prepared by a lime milk-carbon dioxide gas reaction method, a calcium chloride-sodium ash reaction method, a lime milk-sodium ash reaction method, or any other known method. Specifically, an example of the lime milk-carbon dioxide reaction method is a method comprising the steps of: performing mixed-firing of limestone ore with corks, a petroleum fuel (heavy oil or light oil), natural gas, LPG or the like to produce caustic lime; hydrating this caustic lime to prepare a calcium hydroxide slurry; and then bubbling carbon dioxide generated in the mixed-firing into this slurry to react with each other; and thereby producing calcium carbonate. By setting conditions in the carbon dioxide gas reaction, fine particles in desired submicron order can be obtained.

When the modified calcium carbonate in the present invention is observed with a scanning electron microscope, the particle shape of primary particles, which are respectively a minimum unit, is cubic or spherical. The primary particle diameter of the modified calcium carbonate in the present invention can be measured with a scanning electron microscope, as described above, and is preferably from about 0.01 to 0.5 µm, more preferably from 0.01 to 0.1 µm.

When the particle shape is cubic, the primary particle diameter of the modified calcium carbonate in the present invention represents the length of each of the sides. When the shape is spherical, the primary particle diameter represents the diameter. The modified calcium carbonate in the present invention may form a secondary particle wherein the primary particles aggregate.

If the particles are too large, the vulcanization promoter cannot be sufficiently retained and further reinforcing performances such as modulus and abrasion resistance may be unfavorably damaged. On the other hand, if the particles are too small, the dispersibility deteriorates so that the reinforcing effect onto a rubber component may be unfavorably damaged.

Examples of the fatty acids used in the modified calcium carbonate in the present invention include saturated or unsaturated fatty acids having 6 to 24 carbon atoms, and salts or esters thereof.

Examples of the saturated or unsaturated fatty acids having 6 to 24 carbon atoms include stearic acid, palmitic acid, lauric acid, behenic acid, oleic acid, erucic acid, and linoleic acid. Particularly, stearic acid, palmitic acid, lauric acid, and oleic acid are preferred. These may be used in the form of a mixture of two or more thereof.

Examples of the fatty acid salts include alkali metal salts and alkaline earth metal salts.

Examples of the fatty acid esters include esters each made from saturated or unsaturated fatty acids having about 6 to 24 carbon atoms and a lower alcohol having about 6 to 18 carbon atoms.

Examples of the method for the treatment with the fatty acids are methods as described below.

First, the fatty acid is heated in an aqueous solution of an alkali metal, such as an aqueous solution of NaOH or an aqueous solution of KOH, to saponify the fatty acid (converting the acid into a metal salt such as a Na salt or a K salt), thereby turning the acid into a solution form. Next, an aqueous suspension of calcium carbonate is beforehand heated to 30 to 50° C., and to this suspension is added the solution-form fatty acid soap. The resultant is stirred to mix the components to form a layer treated with the fatty acid. In the case of using a soap such as fatty acid Na as it is, a heated aqueous solution thereof is beforehand prepared, and treatment is conducted in the same way as described above.

The treatment can be conducted by use of the fatty aid without saponifying the acid. For example, calcium carbonate is stirred while heated to the melting point of the fatty acid or higher. Thereto is added the fatty acid, and the resultant is stirred to mix the components, whereby a layer treated with the fatty acid can be formed.

Examples of the resin acid used in the present invention include abietic acids, such as abietic acid, dehydroabietic acid and dihydroabietic acid, and polymers thereof, disproportionated rosin, hydrogenated rosin, polymerized rosin, and salts thereof (such as alkali metal salts and alkaline earth metal salts thereof) or esters thereof. Among these, abietic acid and dehydroabietic acid are preferred.

As the method for treatment with a resin acid, the same method with a fatty acid can be adopted. Specifically, first, the resin acid is heated in an aqueous solution of an alkali metal, such as an aqueous solution of NaOH or an aqueous solution of KOH, to saponify the resin acid (converting the acid into a metal salt such as a Na salt or a K salt), thereby turning the acid into a solution form. Next, an aqueous suspension of calcium carbonate is beforehand heated to 30 to 50° C., and this suspension is added to the solution-form resin acid soap. The resultant is stirred to mix the components to form a layer treated with the resin acid. In the case of using a soap such as resin acid Na as it is, a heated aqueous solution thereof is beforehand prepared, and treatment is conducted in the same way as described above. The treatment can be conducted by use of the resin aid without saponifying the acid. For example, calcium carbonate is stirred while heated to the melting point of the resin acid or higher. Thereto is added the resin acid, and the resultant is stirred to mix the components, whereby a layer treated with the resin acid can be formed.

The adhesion amount of at least one organic acid selected from the group consisting of fatty acids and the resin acids is not particularly limited, and the amount is usually from about 0.5 to 20 parts by weight based on 100 parts by weight of calcium carbonate as a raw material. The amount is more preferably from about 1 to 15 parts by weight, even more preferably from about 2 to 12 parts by weight therefor.

In the present invention, the silicic acid used in the modified calcium carbonate can be produced by a known method. For example, silica hydrosol produced by an acid discomposing method, or amorphous silica hydrosol produced by adding, to a sodium silicate solution, an inorganic acid such as hydrochloric acid or sulfuric acid, aluminum sulfate, an organic acid such as acetic acid or acrylic acid, or any other acidic material such as carbon dioxide, can be used. Alternatively, silica hydrosol produced by a dialysis method of passing sodium silicate through a semipermeable membrane, or silica hydrosol produced by an ion exchange method of using an ion exchange resin can be used.

An example of the method for treating calcium carbonate with the silicic acid is a method of adding sodium silicate having an appropriate concentration to a calcium carbonate slurry, dropping an acidic material such as an inorganic acid or an organic acid thereto while stirring the slurry, and then treating the surface of calcium carbonate with the produced silica hydrosol.

In the case of using silica hydrosol prepared in advance, the treatment can be conducted by adding the silica hydrosol to a calcium carbonate slurry and then stirring the slurry vigorously.

The adhesion amount of the silica hydrosol used in the present invention to calcium carbonate is not particularly limited, and the amount is usually from about 0.5 to 15 parts by weight based on 100 parts by weight of calcium carbonate as a raw material, more preferably from about 1 to 12 parts by weight, even more preferably from about 2 to 10 parts by weight therefor. The adhesion amount can be appropriately adjusted in accordance with the BET specific surface area of calcium carbonate, which is an adhesion object, and other factors.

If the adhesion amount of silica hydrosol to calcium carbonate is too small, the number of reaction sites to which a vulcanization promoter such as a silane coupling agent is to be bonded is small so that desired rubber property may not be expressed. On the other hand, if the adhesion amount is too large, silica hydrosol is excessively present, besides silica hydrosol adhering to the calcium carbonate surface, in the solution. Thus, silica hydrosol causes calcium carbonate to be intensely aggregated and solidified when the sol is dried. As a result, coarse particles which are not easily pulverized increase. It is feared that the calcium carbonate filler containing such coarse particles causes a fall in the tear strength, the flex cracking resistance and other properties of the polymer.

In the present invention, the order of the surface treatment with a fatty acid or a resin acid and the treatment with a silicic acid are not particularly limited as described above. It is preferred to subject raw (i.e., non-treated) calcium carbonate firstly to surface treatment with the silicic acid, and then subject the resultant to surface treatment with a fatty acid or a resin acid.

The average particle diameter of the modified calcium carbonate used in the present invention can be set at will as long as desired advantageous effects are produced- The average particle diameter is preferably from 0.01 to 0.5 μm, more preferably from 0.01 to 0.3 μm, even more preferably from 0.01 to 0.1 μm. This average particle diameter can be measured by observing the particles with, for example, a scanning electron microscope.

If the particle diameter is too large, a rubber composition having a sufficient abrasion resistance cannot be unfavorably obtained. On the other hand, if the particle diameter is too small, the dispersibility deteriorates so that the reinforcing effect onto the rubber component may be unfavorably damaged.

The BET specific surface area of the modified calcium carbonate is preferably from about 5 to 120 m$^2$/g, more preferably from about 10 to 120 m$^2$/g, even more preferably from about 60 to 110 m$^2$/g.

If the BET specific surface area is less than 5 m$^2$/g, a sufficient abrasion resistance cannot be unfavorably obtained. If the area is more than 120 m$^2$/g, the scatterability unfavorably becomes strong.

<Inorganic Filler (B)>

Examples of the highly oil-absorbing inorganic filler used in the present invention include silica, aluminum hydroxide, calcium silicate, magnesium carbonate, and superfine zinc particles. These may be used alone or in the form of a mixture of two or more thereof.

As silica, for example, silica which is ordinarily used for rubber reinforcement can be used. Specific examples thereof include precipitated silica and fumed silica.

In the case of, for example, silica, it is more preferred to use silica the BET specific surface area of which is 80 m$^2$/g or more, more preferably from 80 to 400 m$^2$/g, even more preferably from 80 to 250 m$^2$/g, the specific surface area being based on a nitrogen adsorption method.

Silica having a BET specific surface area in the above-mentioned range is particularly preferred since the silica has a good dispersibility, exhibits a large absorbing amount of the vulcanization promoter, and is excellent in reinforcing performances such as tensile property, tear strength, and abrasion resistance.

The oil absorption is preferably from 50 to 600 mL/100 g, more preferably from 70 to 300 mL/100 g, even more preferably from 100 to 300 mL/100 g. The filler having an oil absorption in the above-mentioned range exhibits a large retention amount of the vulcanization promoter so as to maintain powder natures easily.

<Vulcanization Promoter (C)>

The vulcanization promoter (C) used in the present invention is not particularly limited as long as the promoter (C) is a component capable of activating vulcanization in rubber or the like. Examples thereof include an organic silane compound, an organic titanate compound, and an organic aluminate compound. Besides these, a known vulcanization promoter or vulcanization promotion auxiliary, or the like is used. These may be used alone or in the form of a mixture of two or more thereof.

As the organic silane, for example, a material known as a silane coupling agent can be used. Examples of the silane coupling agent include vinyltrichlorosilane, vinyltrimethoxysilane, vinyltriethoxysilane, vinyltris(β-methoxyethoxy)silane, β-(3,4 epoxycyclohexyl)ethyltrimethoxysilane, γ-(2-aminoethyl)aminopropyltrimethoxysilane, γ-glycidoxypropyltrimethoxysilane, γ-glycidoxypropyltrimethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β(aminoethyl)γ-aminopropylmethyldimethoxysilane, N-β(aminoethyl)γ-aminopropyltrimethoxysilane, N-β(aminoethyl)γ-aminopropyltriethoxylsilane, γ-aminopropyltrimethoxysilane, γ-aminopropyltriethoxysilane, N-phenyl-γ-aminopropyltrimethoxysilane, γ-chloropropyltrimethoxysilane, γ-mercaptopropyltrimethoxysilane, bis-(3-[triethoxysilyl]-propyl)-disulfone, and bis-(3-[triethoxysilyl]-propyl)-tetrasulfone (TESPT). These may be used alone or in combination of two or more thereof.

It is preferred to use, among these, γ-(2-aminoethyl)aminopropyltrimethoxysilane, N-β(aminoethyl)γ-aminopropyltrimethoxysilane, γ-mercaptopropyltrimethoxysilane, or bis-(3-[triethoxysilyl]-propyl)-tetrasulfone.

As the organic titanate compound, any titanate coupling agent that is blended into conventional rubbers or plastics can be blended. Examples thereof include isopropyltriisostearoyl titanate, isopropyltridodecylbenzenesulfonyl titanate, isopropyltris(dioctylpyrophosphate) titanate, tetraisopropylbis(dioctylphosphate) titanate, tetraoctylbis(ditridecylphosphate) titanate, tetra(2,2-diallyloxymethyl-1-butyl)bis(ditridecyl)phosphate titanate, bis(dioctylpyrophosphate)oxyacetate titanate, bis(dioctylpyrophophate)ethylene titanate, isopropyltrioctanoyl titanate, isoproypldimethacrylisostearoyl titanate, isopropylisostearoyldiacryl titanate, isopropyltri(dioctylphosphate) titanate, isopropyltricumylphenyl titanate, isopropyltri(N-amidoethyl.aminoethyl) titanate, dicumylphenyloxyacetate titanate, and diisostearoylethylene titanate. These may be used alone or in combination of two or more thereof. Among these, isopropyltriisostearoyl titanate is preferred.

As the organic aluminate compound, an aluminate coupling agent can be used. An example thereof is acetoalkoxyaluminum diisopropylate.

<Preparation of the Powdery White Vulcanization Promoter Composition>

The powdery white vulcanization promoter composition of the present invention can be prepared by mixing the modified calcium carbonate (A), the inorganic filler (B), and the vulcanization promoter (C). The method for the mixing is not particularly limited. In general, the following method is preferably adopted: a method of mixing the modified calcium carbonate (A) and the inorganic filler (B) that are powdery with each other at a predetermined ratio, adding the vulcanization promoter (C) which is in a liquid form while stirring the powdery mixture, and then mixing the components.

The mixing ratio of the modified calcium carbonate (A) to the inorganic filler (B) (the ratio of (A):(B)) is within a range of from 30:70 to 95:5. The ratio more preferably is within a range of from 30:70 to 90:10. If the mixing ratio of the inorganic filler (B) is too small, the vulcanization promoter (C) bleeds easily with the passage of time. Thus, the state of the powder may not be kept with ease. If the ratio of the inorganic filler (B) is too large, the amount of the modified calcium carbonate (A) decreases relatively so that the vulcanization promoter (C) may be inactivated. Thus, the storage stability may decline.

The content by percentage of the vulcanization promoter (C) is from 30 to 80% by weight based on the total (the whole of the modified calcium carbonate (A), the inorganic filler (B), and the vulcanization promoter (C)), preferably from 30 to 70% by weight thereof, more preferably from 40 to 70% by weight thereof.

If the content by percentage of the vulcanization promoter (C) is less than 30% by weight, a large amount of the vulcanization promoter composition needs to be blended into rubber or others. Thus, the workability of the rubber or others or the mechanical strength thereof may lower. If the content by percentage of the vulcanization promoter (C) is too large, the nature or state of the powder may not be kept.

The rubber composition of the present invention will be specifically described hereinafter.

<Rubber Component>

As the rubber component, at least one selected from natural rubber and diene synthetic rubbers is used.

The diene synthetic rubbers which can be used may each be a diene rubber which can be crosslinked. Specific examples of the diene synthetic rubbers include cis-1,4-polyisoprene, emulsion-polymerized styrene butadiene copolymer, solution-polymerized styrene butadiene copolymer, low cis-1,4-polybutadiene, high cis-1,4-polybutadiene, ethylene-propylene-diene copolymer, chloroprene, halogenated butyl rubber, and acrylonitrile-butadiene rubber.

Among the above-mentioned rubber components, there can be preferably used natural rubber, cis-1,4-polyisoprene, emulsion-polymerized styrene butadiene copolymer, solution-polymerized styrene butadiene copolymer, low cis-1,4-polybutadiene, or high cis-1,4-polybutadiene.

Regarding the rubber component, any one of the above-mentioned natural rubber or the diene synthetic rubbers may be used, or a mixture of two or more thereof may be used. The mixing ratio therebetween can be appropriately set in accordance with required properties, and others.

<Rubber Composition>

The rubber composition of the present invention is a composition wherein precipitated silica and the vulcanization promoter composition of the present invention are blended into the rubber component.

The precipitated silica used in the present invention may be precipitated silica which is ordinarily blended as a reinforcing agent into rubber. Usually, the blended amount of the precipitated silica is preferably from about 10 to 100 parts by weight based on 100 parts by weight of the rubber component, more preferably from 20 to 100 parts by weight therefor, in particular preferably from 20 to 90 parts by weight therefor.

If the blended amount of the precipitated silica is too small, the abrasion resistance of the rubber composition unfavorably lowers. If the amount is too large, the viscosity of the rubber rises so that the workability unfavorably deteriorates.

Regarding the blended amount of the vulcanization promoter composition, the composition is blended in such a manner that the amount of the vulcanization promoter (C) in the vulcanization promoter composition is set preferably into 1 to 40 parts by weight, more preferably into 5 to 20 parts by weight, in particular preferably into 5 to 10 parts by weight based on the 100 parts by weight of the precipitated silica. The reason why the blended amount of the vulcanization promoter composition is decided on the basis of the blended amount of the precipitated silica is that the blended amount of the vulcanization promoter (C) is generally decided on the basis of the blended amount of precipitated silica.

If the blended amount of the vulcanization promoter composition is too small, the reinforcing performance cannot be unfavorably improved when the composition is blended into the rubber. If the amount is too large, costs for the rubber composition unfavorably increase.

If necessary, a known compounding agent may be added to the rubber composition of the present invention. For example, the other filler including fumed silica, clay, talc, aluminum hydroxide, and carbon black can be appropriately used together. Furthermore, if desired, a process oil, an antioxidant, an age resistor, an activator, an additive such as stearic acid, zinc oxide or wax, or a vulcanizing agent such as sulfur or a vulcanization promoter can be blended.

The rubber composition of the present invention can be produced by kneading the rubber component, the precipitated silica, the vulcanization promoter composition, and optionally-selected compounding agents, heating the mixture, extruding the mixture, and subjecting the resultant to vulcanization and others.

Conditions for the kneading are not particularly limited, and can be appropriately selected from the charging volume to a kneading machine, the rotary speed of the rotor, the ram pressure, the kneading temperature, the kneading time, the kind of the kneading machine, and the like in accordance with the purpose. The kneading machine is not particularly limited, and both of a closed type or of an open type may be used. Examples thereof are a known machine ordinarily used to knead a rubber composition. Specific examples thereof include a Banbury mixer (registered trade name), an Intermix (registered trademark), a kneader, and roll.

Conditions for the heating are not particularly limited, and can be appropriately selected about the heating temperature, the heating time, and the heating machine, and the like in accordance with the purpose. The heating machine is, for example, a roll mill ordinarily used to heat a rubber composition.

Conditions for the extrusion are not particularly limited, and can be appropriately selected from the extrusion time, the extrusion speed, the extruder, the extrusion temperature and the like in accordance with the purpose. The extruder is, for example, an extruder ordinarily used to extrude a rubber composition. The extrusion temperature can be appropriately decided.

The machine, manner and conditions used in the vulcanization are not particularly limited, and can be appropriately selected in accordance with the purpose. The machine used in the vulcanization is, for example, a molding vulcanizing machine using a mold. In the conditions for the vulcanization, the vulcanization temperature is usually from 100 to 190° C.

EXAMPLES

The present invention will be more specifically described with respect to working examples and comparative examples hereinafter. However, the present invention is not limited to the working examples.

[Preparation of Modified Calcium Carbonate]

A synthetic calcium carbonate slurry having a BET specific surface area of 75 $m^2/g$ was heated to 40° C. while stirred sufficiently. Sodium silicate (sodium silicate (manufactured by Wako Pure Chemical Industries, Ltd.)) was diluted water 10 times at room temperature, and 7 parts by weight of the aqueous solution of sodium silicate were added to 100 parts by weight of this synthetic calcium carbonate. Diluted hydrochloric acid was introduced into the solution to produce a silica layer on the surface of the calcium carbonate. Next, to 100 parts by weight of this synthetic calcium carbonate, 5 parts by weight of mixed fatty acids (oleic acid, stearic acid and palmitic acid (manufactured by Wako Pure Chemical Industries, Ltd.)) were added, and were heated to 90° C. and stirred to be saponified. Next, the resultant was dehydrated, dried and pulverized to yield calcium carbonate powder having a fatty acid layer. The yielded calcium carbonate was referred to as modified calcium carbonate a.

[Preparation of Powdery White Vulcanization Promoter Compositions]

Examples 1 to 5

The modified calcium carbonate a was used as the modified calcium carbonate (A) and precipitated silica described below was used as the highly oil-absorbing inorganic filler (B). A silane coupling agent (TESPT) described below was used as the vulcanization promoter (C). Each blend ratio shown in Tables 1 and 3 was used to prepare each powdery white vulcanization promoter composition.

Specifically, the modified calcium carbonate and the inorganic filler as powdery components were stirred and mixed in a super mixer, and then the vulcanization promoter was sprayed onto this mixture while the mixture was stirred. In this way, each powdery white vulcanization promoter composition was prepared.

Precipitated silica: white carbon, oil absorption: 200 mL/100 g, trade name: "Nipsil VN3", manufactured by Nippon Silica Industrial Co., Ltd.

Silane coupling agent: bis-(3-[triethoxysilyl]-propyl)tetrasulfone (TESPT), manufactured by Degussa Co.

Comparative Examples 1 to 5

The modified calcium carbonate a or comparative calcium carbonate b or c described below was used as calcium carbonate, and, at each blend ratio shown in Tables 1 and 2, the calcium carbonate, the precipitated silica and TESPT were stirred and mixed in the same way as described above to prepare each powdery white vulcanization promoter composition.

Comparative calcium carbonate b: synthetic calcium carbonate, trade name: "Silver W", manufactured by Shiraishi Kogyo Kaisha, Ltd.

Comparative calcium carbonate c: calcium carbonate obtained in the same way for producing the modified calcium carbonate a except that sodium silicate was not added was referred to as comparative calcium carbonate c.

[Preparation of Rubber Compositions]

Each of the above-mentioned vulcanization promoter compositions was blended into a rubber component to prepare a rubber composition. As the rubber component, SBR described below was used, and the following were used as additives: zinc oxide, stearic acid, precipitated silica, a process oil, an age resistor, a vulcanization promoter D, a vulcanization promoter CZ, and sulfur. As the process oil, the age resistor and the vulcanization promoter, products described below were specifically used. The used precipitated silica was the same as used when the vulcanization promoter composition was prepared.

The vulcanization promoter composition was added to a rubber composition in such a manner that the amount of TESPT in the vulcanization promoter composition was 5 parts by weight based on 100 parts by weight of the rubber (at an amount of 10 parts by weight based on 100 parts by weight of the precipitated silica). Accordingly, the vulcanization promoter composition was added at an amount of 10 parts by weight (each of the examples except Examples 4 and 5), at an amount of 16.7 parts by weight (Example 4), or at an amount of 7.1 parts by weight (Example 5) for 100 parts by weight of the rubber.

(Composition of the Rubber Composition)

SBR: 100 parts by weight

Zinc oxide: 4 parts by weight

Stearic acid: 2 parts by weight

Precipitated silica: 50 parts by weight

Process oil: 25 parts by weight

Age resistor: 1 part by weight

Vulcanization promoter D: 1 part by weight

Vulcanization promoter CZ: 1 part by weight

Sulfur: 2 parts by weight

Vulcanization promoter composition: 10 parts by weight, 16.7 parts by weight, or 7.1 parts by weight SBR: solution-polymerized SBR, trade name: "S-SBR SL552", manufactured by JSR Corp.; amount of bonded styrene: 24%; cis-1,4 bond amount: 20%

Process oil: trade name: "NP-24", manufactured by Idemitsu Kosan Co., Ltd.

Age resistor: trade name: "NOCRAC 224", manufactured by OuchiShinko Chemical Industrial Co., Ltd.

Vulcanization promoter D: trade name "NOCCELER D", manufactured by OuchiShinko Chemical Industrial Co., Ltd.

Vulcanization promoter CZ: trade name "NOCCELER CZ", manufactured by OuchiShinko Chemical Industrial Co., Ltd.

The mix of each of the vulcanization promoter compositions was performed, using 8-inch two roll. The resultant rubber composition was subjected to pressing vulcanization on the basis of an optimal vulcanization time tc(90) calculated out by means of a curelasto meter (at 160° C.), to yield a rubber sheet 2 mm in thickness.

Here, in the incorporation of each of the vulcanization promoter compositions of Examples 1 to 5 and Comparative Examples 1 to 5, the following three vulcanization promoter composition species were used: a species of the vulcanization promoter composition immediately after the preparation thereof; a species of the vulcanization promoter composition stored in a paper bag for 3 months; and a species of the vulcanization promoter composition stored in the paper bag for 6 months. Accordingly, in each of the Examples and the Comparative Examples, three rubber composition species after a lapse of 0 month, that of 3 months, and that of 6 months were prepared.

[Evaluation of the Rubber Compositions]

In the rubber sheet obtained from each of the rubber compositions of Examples 1 to 5 and Comparative Examples 1 to 5, an unvulcanized rubber test, a tensile test, and an abrasion test were made by methods described below.

1. Tensile Test

A Schopper tensile strength tester was used to measure the 300% modulus (the tensile strength at the time of 300% stretch) at 23° C. in accordance with a method prescribed in JIS K 6251.

2. Heat Build-up

A flexometer was used to measure the heat build-up temperature from an initial temperature of 40° C. in accordance with a method prescribed in JIS K 6265. The used test piece was a columnar piece having a diameter of 17.80 mm and a height of 25.0 mm, and a static compressive stress of 1 MPa was applied thereto 1800 times per minute at a stroke of 4 m/m. When 25 minutes elapsed, the heat build-up temperature ($\Delta t$) was measured.

The evaluation results are shown in Tables 1 to 3.

TABLE 1

|  |  | Comp. Ex. 1 | | | Ex. 1 | | | Ex. 2 | | | Ex. 3 | | | Comp. Ex. 2 | | |
| --- | --- | --- | --- | --- | --- | --- | --- | --- | --- | --- | --- | --- | --- | --- | --- | --- |
| Vulcanization Promoter Composition | Modified Calcium Carbonate a | 49 | | | 45 | | | 35 | | | 20 | | | 10 | | |
|  | Precipitated Silica | 1 | | | 5 | | | 15 | | | 30 | | | 40 | | |
|  | TESPT | 50 | | | 50 | | | 50 | | | 50 | | | 50 | | |
|  | Form | Pasty | | | Powdery | | | Powdery | | | Powdery | | | Powdery | | |
| Rubber Composition | Elapsed Time (months) | 0 | 3 | 6 | 0 | 3 | 6 | 0 | 3 | 6 | 0 | 3 | 6 | 0 | 3 | 6 |
|  | 300% Modulus (MPa) | — | — | — | 8.5 | 8.3 | 8.7 | 8.5 | 8.3 | 8.5 | 8.5 | 8.4 | 8.7 | 8.8 | 8.7 | 8.3 |
|  | Heat build-up (°C.) | — | — | — | 11 | 10 | 8 | 12 | 10 | 12 | 12 | 12 | 12 | 20 | 40 | <50 |

TABLE 2

|  |  | Comp. Ex. 3 | | | Comp. Ex. 4 | | | Comp. Ex. 5 | | |
| --- | --- | --- | --- | --- | --- | --- | --- | --- | --- | --- |
| Vulcanization Promoter Composition | Comparative Calcium Carbonate b | — | | | — | | | 35 | | |
|  | Comparative Calcium Carbonate c | — | | | 35 | | | — | | |
|  | Precipitated Silica | 50 | | | 15 | | | 15 | | |
|  | TESPT | 50 | | | 50 | | | 50 | | |
|  | Form | Powdery | | | Powdery | | | Pasty | | |
| Rubber Composition | Elapsed Time (months) | 0 | 3 | 6 | 0 | 3 | 6 | 0 | 3 | 6 |
|  | 300% Modulus (MPa) | 8.3 | 8.9 | 4.5 | 8.3 | 8.5 | 8.9 | — | — | — |
|  | Heat build-up (°C.) | 25 | 40 | 50> | 11 | 15 | 21 | — | — | — |

As is evident form Tables 1 and 2, the rubber compositions wherein the vulcanization promoter compositions of Examples 1 to 3 according to the present invention were used exhibited stable rubber properties even after the three and six months elapsed. On the other hand, it is understood that in Comparative Example 3, wherein only precipitated silica was used as a powdery component, the heat build-up at the time of the dynamic fatigue was large from immediately after the start of the test, and the 300% modulus declined after the lapse of the 6 months. It appears that this was based on a deterioration in the activity of the vulcanization promoter, resulting from a change in the component with the passage of time.

It can be understood that in Comparative Example 4, wherein the comparative calcium carbonate c treated with no silica was used, the heat build-up deteriorated in comparison with that in Example 2 according to the present invention.

In Comparative Examples 1 and 5, the form of the vulcanization promoter composition was pasty, so as not to be powdery. Accordingly, in Comparative Examples 1 and 5, evaluation of the rubber composition was not made.

As is clear from comparison of Examples 1 to 3 with Comparative Examples 1 to 5, the use of the vulcanization promoter composition of the present invention gives a small heat build-up when dynamic fatigue is given to the rubber composition, and gives a small change in the modulus with an elapsed time. In other words, it is understood that a good storage stability and a good resistance to heat build-up can be obtained. It is also understood that the incorporation of the modified calcium carbonate at a blend ratio in the present invention gives a good storage stability and a good resistance to heat build-up.

TABLE 3

|  |  | Ex. 4 | Ex. 3 | Ex. 5 |
| --- | --- | --- | --- | --- |
| Vulcanization Promoter Composition | Modified Calcium Carbonate a | 28 | 20 | 12 |
|  | Precipitated Silica | 42 | 30 | 18 |
|  | TESPT | 30 | 50 | 70 |
|  | Form | Powdery | Powdery | Powdery |

TABLE 3-continued

|  |  | Ex. 4 | | | Ex. 3 | | | Ex. 5 | | |
| --- | --- | --- | --- | --- | --- | --- | --- | --- | --- | --- |
| Rubber Composition | Elapsed Time (months) | 0 | 3 | 6 | 0 | 3 | 6 | 0 | 3 | 6 |
|  | 300% Modulus (MPa) | 8.4 | 8.5 | 8.3 | 8.5 | 8.4 | 8.7 | 8.6 | 8.9 | 8.8 |
|  | Heat build-up (° C.) | 12 | 11 | 13 | 12 | 12 | 12 | 13 | 12 | 13 |

As is clear form the results shown in Table 3, when TESPT, which is a vulcanization promoter, is used at a blend ratio in the range in the present invention, a good storage stability and a good heat build-up resistance can be obtained.

What is claimed is:

1. A powdery white vulcanization promoter composition comprising; a modified calcium carbonate (A) surface-treated with a fatty acid and a silicic acid or with a resin acid and a silicic acid; a highly oil-absorbing inorganic filler (B) exhibiting an oil absorption of 50 to 300 mL/100 g; and a vulcanization promoter (C) which is in a liquid form at ordinary temperature; wherein the mixing ratio by weight of the modified carbon calcium (A) to the inorganic filter (B) (the ratio of (A):(B)) is within a range of from 30:70 to 95:5, and the content by percentage of the vulcanization promoter (C) is from 30 to 80% by weight based on the total of the composition.

2. The powdery white vulcanization promoter composition according to claim 1, wherein the modified calcium carbonate (A) has an average primary particle diameter of 0.01 to 0.5 μm.

3. The powdery white vulcanization promoter composition according to claim 1, wherein the vulcanization promoter (C) is at least one selected from an organic silane compound, an organic titanate compound, or an organic aluminate compound.

4. The powdery white vulcanization promoter composition according to claim 2, wherein the vulcanization promoter (C) is at least one selected from an organic silane compound, an organic titanate compound, or an organic aluminate compound.

5. The powdery white vulcanization promoter composition according to claim 1, wherein the inorganic filler (B) is at least one selected from silica, calcium silicate, magnesium carbonate, or an aluminum hydroxide.

6. The powdery white vulcanization promoter composition according to claim 2, wherein the inorganic filler (B) is at least one selected from silica, calcium silicate, magnesium carbonate, or an aluminum hydroxide.

7. The powdery white vulcanization promoter composition according to claim 3, wherein the inorganic filler (B) is at least one selected from silica, calcium silicate, magnesium carbonate, or an aluminum hydroxide.

* * * * *